United States Patent
Johnson (10) Patent No.: US 9,265,980 B2
(45) Date of Patent: Feb. 23, 2016

(54) FLOW CONTROL ASSEMBLY FOR A FIRE SPRINKLER SYSTEM

(71) Applicant: Augustus W. Johnson, Sebring, FL (US)

(72) Inventor: Augustus W. Johnson, Sebring, FL (US)

(*) Notice: Subject to any disclaimer, the term of this patent is extended or adjusted under 35 U.S.C. 154(b) by 207 days.

(21) Appl. No.: 13/924,691

(22) Filed: Jun. 24, 2013

(65) Prior Publication Data

US 2014/0374125 A1    Dec. 25, 2014

(51) Int. Cl.
| | |
|---|---|
| A62C 35/68 | (2006.01) |
| A62C 35/58 | (2006.01) |
| A62C 37/50 | (2006.01) |
| F16K 15/03 | (2006.01) |
| F16K 17/28 | (2006.01) |
| A62C 35/60 | (2006.01) |
| F16K 11/20 | (2006.01) |
| F16K 37/00 | (2006.01) |
| F16K 31/54 | (2006.01) |
| F16K 15/18 | (2006.01) |
| F16K 27/02 | (2006.01) |

(52) U.S. Cl.
CPC ............. *A62C 35/60* (2013.01); *A62C 35/68* (2013.01); *F16K 11/20* (2013.01); *F16K 15/181* (2013.01); *F16K 27/0227* (2013.01); *F16K 31/54* (2013.01); *F16K 37/0008* (2013.01); *F16K 37/0041* (2013.01); *Y10T 137/7069* (2015.04); *Y10T 137/8242* (2015.04); *Y10T 137/8275* (2015.04); *Y10T 137/8326* (2015.04); *Y10T 137/87877* (2015.04); *Y10T 137/88054* (2015.04)

(58) Field of Classification Search
CPC ........ A62C 35/68; A62C 35/58; A62C 35/08; A62C 35/50; B05B 3/02; F16K 15/00; Y10S 239/15

USPC ................ 169/16, 18, 23, 21, 19; 137/614.2; 239/504, 498

See application file for complete search history.

(56) References Cited

U.S. PATENT DOCUMENTS

| | | | | |
|---|---|---|---|---|
| 1,953,671 | A * | 4/1934 | Conran | 169/5 |
| 3,702,158 | A * | 11/1972 | Livingston et al. | A62C 35/605 169/15 |
| 5,720,351 | A * | 2/1998 | Beukema | A62C 35/62 169/16 |
| 5,944,051 | A | 8/1999 | Johnson | |
| 6,396,404 | B1 * | 5/2002 | McHugh | A62C 35/605 137/557 |
| 6,415,870 | B1 * | 7/2002 | Matsuoka | A62C 35/60 169/16 |

(Continued)

OTHER PUBLICATIONS

NFPA, p. 13-310, Installation of Sprinkler Systems, 2013 Edition.

*Primary Examiner* — Arthur O Hall
*Assistant Examiner* — Joseph A Greenlund
(74) *Attorney, Agent, or Firm* — Dority & Manning, PA (57) ABSTRACT

A flow control assembly for a fire sprinkler system includes a valve housing having an inlet opening and an outlet opening. The valve housing defines a fluid flow path that extends between the inlet opening and the outlet opening. A flow control valve is disposed within the fluid flow path. A swing check valve is disposed within the fluid flow path of the valve housing downstream from the flow control valve. The swing check valve includes a clapper that is connected to an actuator arm. An electrical switch is disposed outside of the valve housing. A mechanical linkage includes a first end that extends through the valve housing and engages with the actuator arm. The mechanical linkage also includes a second end that is coupled to the electrical switch. The first end translates with said actuator arm.

20 Claims, 6 Drawing Sheets

(56) References Cited

U.S. PATENT DOCUMENTS

| | | | | |
|---|---|---|---|---|
| 6,848,513 B2* | 2/2005 | Jackson | .................. | A62C 35/68 169/16 |
| 6,860,331 B2* | 3/2005 | Hagen | .................... | A62C 35/68 169/16 |
| 6,945,509 B2* | 9/2005 | Royse | .................... | A01G 25/16 137/554 |
| 7,239,576 B2* | 7/2007 | Shimbayashi | ....... | G11C 7/1051 365/191 |
| 7,363,987 B2* | 4/2008 | Grant | .................... | A62C 35/58 169/16 |
| 8,297,370 B2* | 10/2012 | Wilkins | ............... | A62C 35/645 169/16 |
| 8,727,029 B2* | 5/2014 | Feenstra | ................ | A62C 35/68 137/597 |
| 8,727,030 B2* | 5/2014 | Feenstra | ................ | A62C 35/68 137/597 |
| 2007/0289751 A1* | 12/2007 | Feenstra | ............. | A62C 35/645 169/16 |
| 2011/0166714 A1* | 7/2011 | Stachnik | ................ | A62C 35/60 700/282 |
| 2011/0226495 A1* | 9/2011 | Burkhart | ................ | A62C 35/62 169/16 |

* cited by examiner

FLOW CONTROL ASSEMBLY FOR A FIRE SPRINKLER SYSTEM

FIELD OF THE INVENTION

The present invention generally involves a fire sprinkler system. More specifically, the invention relates to a flow control assembly for controlling a flow of water between a standpipe riser and a sprinkler head of a fire sprinkler system.

BACKGROUND OF THE INVENTION

Fire sprinkler systems for multi-story buildings generally include a standpipe riser that is fluidly coupled to one or more sprinkler heads via a main feed line having a plurality of pipes that extend therebetween. Various valves are fluidly connected to the pipes to start, stop or otherwise control the flow of water between the standpipe riser and the sprinkler heads. The fire sprinkler system also may include other separate components such as a flow indicator, a pressure gauge, and alarm system and/or a drainage system.

Typically, the standpipe riser is situated vertically within a stairwell or other limited mechanical space. The valves, the flow indicator and/or the pressure gauge are disposed in a straight line or in series generally extending horizontally from the standpipe riser. As a result, a large amount of valuable space within the stairwell or other limited mechanical space may be required to accommodate the standpipe riser and the various components. In addition, each valve and/or component necessitates a break in the main feed line pipes. As a result, multiple flange-to-flange joints, pipe taps, threaded and/or grooved pipe connections are required, thus providing multiple leak and/or system failure opportunities.

BRIEF DESCRIPTION OF THE INVENTION

Aspects and advantages of the invention are set forth below in the following description, or may be obvious from the description, or may be learned through practice of the invention.

One embodiment of the present invention is a flow control assembly for a fire sprinkler system. The flow control assembly includes a valve housing having an inlet opening, an outlet opening and defining a fluid flow path between the inlet opening and the outlet opening. A flow control valve is disposed within the fluid flow path downstream of the inlet opening. A swing check valve is disposed within the fluid flow path of the valve housing downstream from the flow control valve. The swing check valve includes a clapper that is connected to an actuator arm. An electrical switch is disposed outside of the valve housing. A mechanical linkage includes a first end that extends through the valve housing and engages with the actuator arm. The mechanical linkage also includes a second end that is coupled to the electrical switch. The first end translates with said actuator arm.

Another embodiment of the present invention is a fire sprinkler supply system. The fire sprinkler supply system includes a standpipe riser, a fire sprinkler head disposed downstream from the standpipe riser and a flow control assembly that provides for fluid communication between the standpipe riser and the fire sprinkler head. The flow control assembly includes a valve housing having an inlet opening that is in fluid communication with the standpipe riser and an outlet opening that is in fluid communication with the fire sprinkler head. The valve housing defines a fluid flow path between the inlet opening and the outlet opening. A flow control valve is disposed within the fluid flow path downstream from the inlet opening. A swing check valve is disposed within the fluid flow path of the valve housing downstream from the flow control valve. The swing check valve includes a clapper that is connected to an actuator arm. An electrical switch is disposed outside of the valve housing. A mechanical linkage includes a first end that extends through the valve housing and that engages with the actuator arm. The mechanical linkage also includes a second end that is coupled to the electrical switch. The first end of the mechanical linkage translates with the actuator arm.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. In addition, the terms "upstream" and "downstream" also implicate the fact that the elements having this relative relationship are connected in fluid communication with each other. The term "axially" refers to a relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
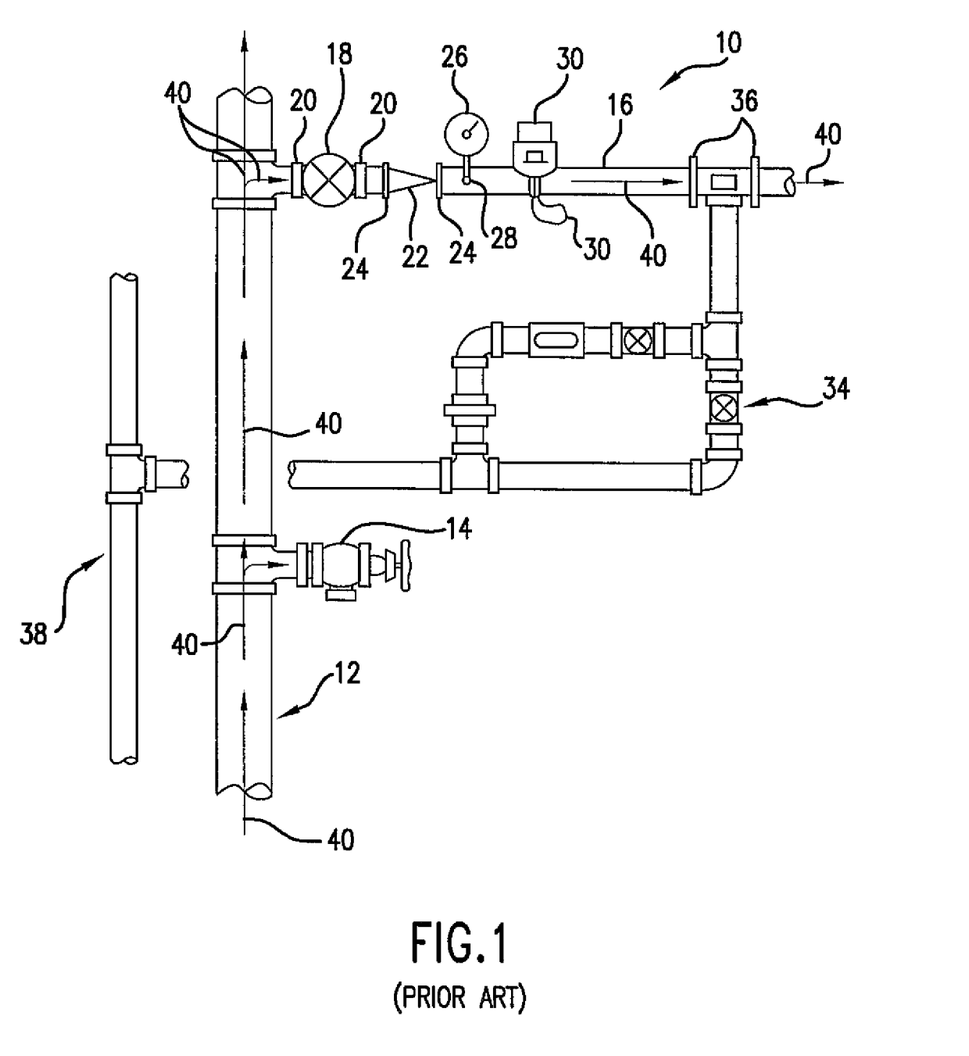
FIG. 1 provides a schematic of a portion of a known exemplary fire sprinkler system.

Referring now to the drawings, wherein identical numerals indicate the same elements throughout the figures, FIG. 1 provides a side view of a conventional fire sprinkler system 10. In particular configurations, as shown in FIG. 1, the fire sprinkler system 10 includes a standpipe riser 12 that is fluidly connected to a water supply (not shown). The standpipe riser 12 may extend generally vertically upward to provide water to multiple floors of a building or other structure for firefighting. A fire hose valve 14 may be fluidly connected to the standpipe riser 12. The fire hose valve 14 provides a localized source of water for firefighting.

The conventional fire sprinkler system 10 includes a main feed line 16 that is fluidly connected to the standpipe riser 12. The main feed line 16 is fluidly connected to at least one sprinkler head (not shown) positioned within the building or structure. A floor control valve 18 is fluidly connected to the main feed line 16 via a pair of flange-to-flange, threaded or grooved fluid coupling connections 20 proximate to the standpipe riser 12. A check valve 22 is fluidly connected to the main feed line 16 downstream from the floor control valve 18 via a pair of flange-to-flange, threaded or grooved fluid coupling connections 24.

A pressure gauge 26 is positioned downstream from the check valve 22. The pressure gauge 26 provides a pressure reading of water within the main feed line 16 via a threaded tap hole 28 in the main feed line 16. A water flow indicator switch 30 is disposed downstream from the check valve 22 and/or downstream from the pressure gauge 26. The water flow indicator switch 30 provides an electrical signal which indicates that water is flowing within the main feed line 16.

The water flow indicator switch 30 may be fluidly connected to the main feed line 16 through a hole (not shown) formed in the pipe. Generally, the water flow switch includes an actuator vane (not shown) that extends into the flow path of the main feed line 16. A gasket (not shown) is used between a housing of the water indicator flow switch 30 and the pipe to prevent leaks. The water flow indicator switch 30 is held in place by a U-bolt that extends around the main feed line 16.

A drain and test system 34 is fluidly connected to the main feed line 16 downstream from the water flow indicator switch 30 via a pair of flange-to-flange or threaded fluid coupling connections 36. The drain and test system 34 is fluidly connected to a vertically disposed drain riser 38.

The fire sprinkler system 10 as previously described is commonly referred to as a combined sprinkler/standpipe system. In operation, the floor control valve 18 is set in an open flow position and the main feed line 16 is charged with water 40 from the standpipe riser 12. The water 40 remains static within the main feed line 16 until the sprinkler head opens, thus causing the water 40 to flow through the main feed line 16. Once the water 40 begins to flow through the main feed line 16, an alarm signal is generated by the water flow indicator switch 28. The alarm signal may be received by a local and/or a remote monitoring station to sound an audible/visual alarm and/or to alert authorities.

The check valve 22 generally prevents the main feed line 16 from draining in case the standpipe riser 12 is damaged or drained, thus reducing the time required to re-energize the main feed line 16 once the standpipe riser has been repaired and recharged. Each of the flange-to-flange or threaded fluid coupling connections 20, 24, 36 and/or the tap 28 disposed along the main feed line 16 provides an opportunity for a leak and/or a connection failure, thus resulting in a compromised or in a non-functional sprinkler system. In addition, a generous amount of otherwise limited space within the building or structure is required to accommodate each of these components in series along the main feed line 16.

Figure 2:
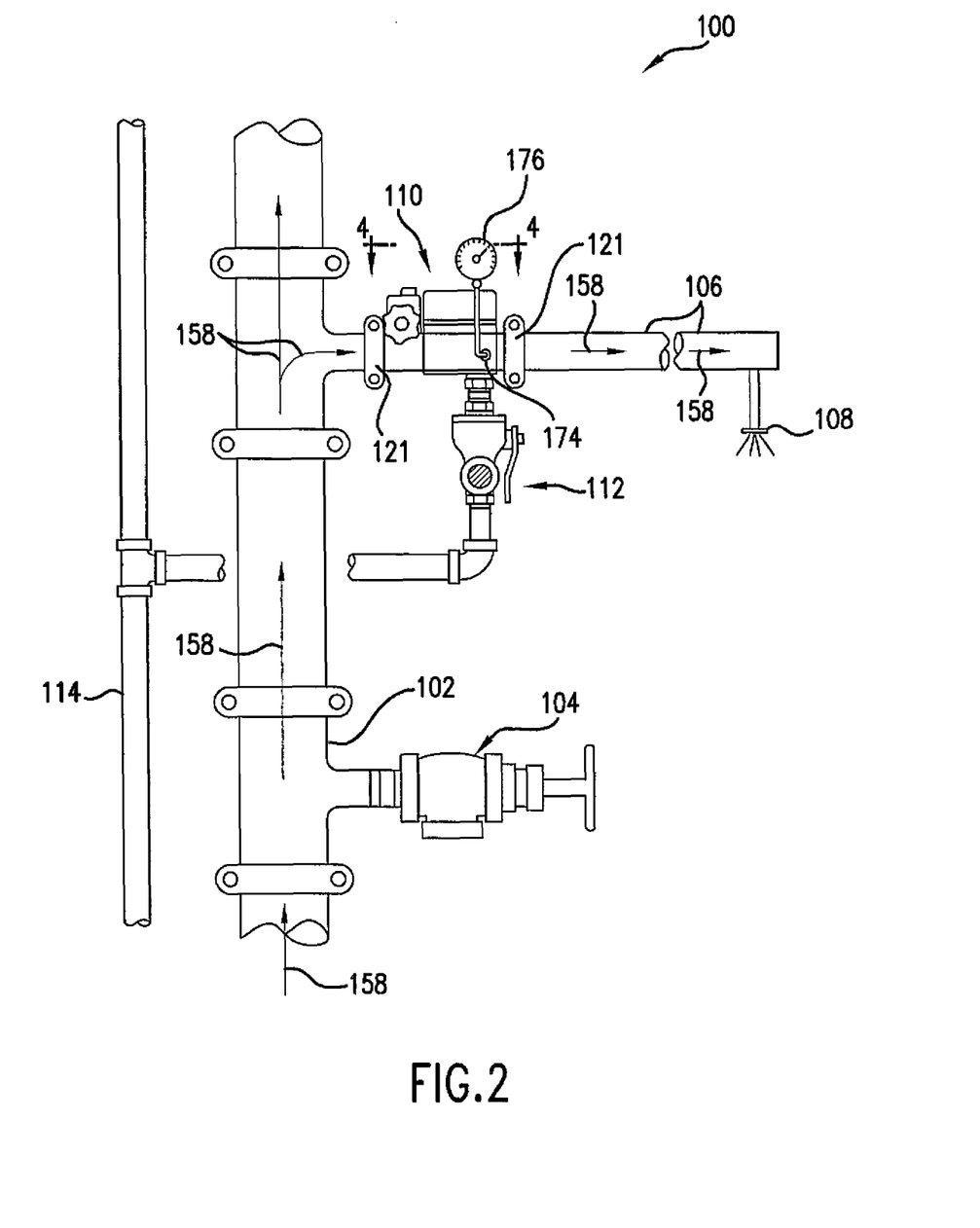
FIG. 2 provides a schematic of a portion of a fire sprinkler system including a flow control valve assembly according to various embodiments of the present invention.

FIG. 2 provides a side view of an exemplary fire sprinkler system 100 as may incorporate various embodiments of the present invention. As shown in FIG. 2, the fire sprinkler system 100 includes a standpipe riser 102 that is fluidly connected to a water supply (not shown). The standpipe riser 102 extends generally vertically upward to provide water to multiple floors of a building or other structure for firefighting. A fire hose valve 104 may be fluidly connected to the standpipe riser 102. The fire hose valve 104 provides a localized source of water for firefighting, thus reducing a length of fire hose (not shown) necessary to reach a fire on a particular floor of the multistory building or structure.

A main feed line 106 is fluidly connected to the standpipe riser 102. The main feed line 106 is fluidly connected to at least one sprinkler head 108 that is positioned within the building or structure. In particular embodiments, a flow control assembly 110 is fluidly connected to the main feed line 106 to provide for fluid communication between the standpipe riser 102 and the sprinkler head 108. A test and/or drain system 112 may be fluidly connected to the flow control assembly 110. The test and/or drain system 112 may be fluidly connected to a drain riser 114.

Figure 3:
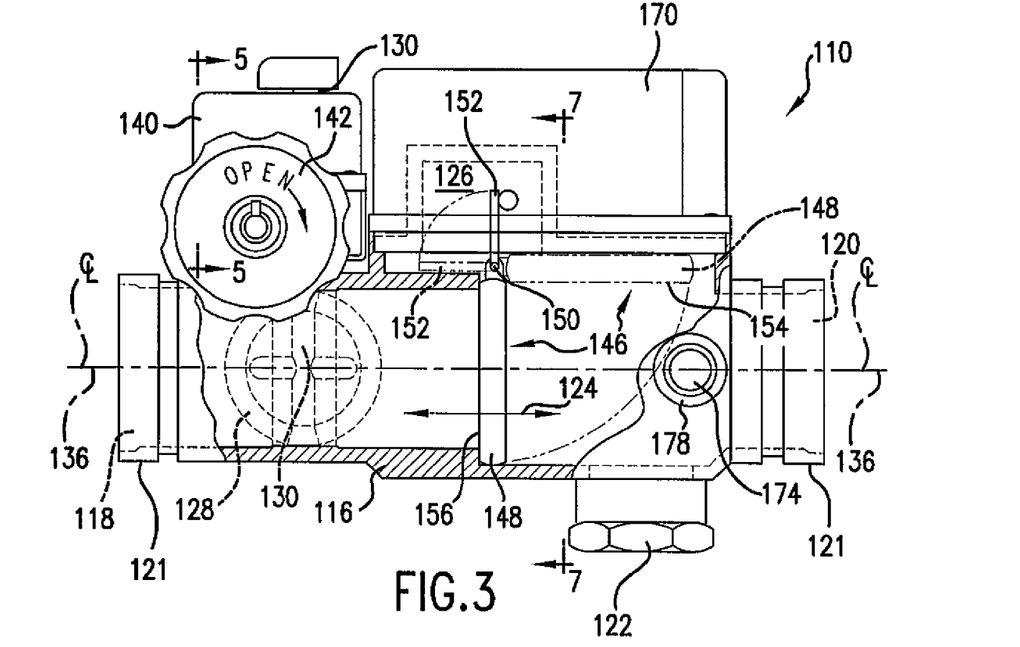
FIG. 3 provides a side view of the flow control assembly as shown in FIG. 2, according at least to one embodiment of the present invention.
Figure 4:
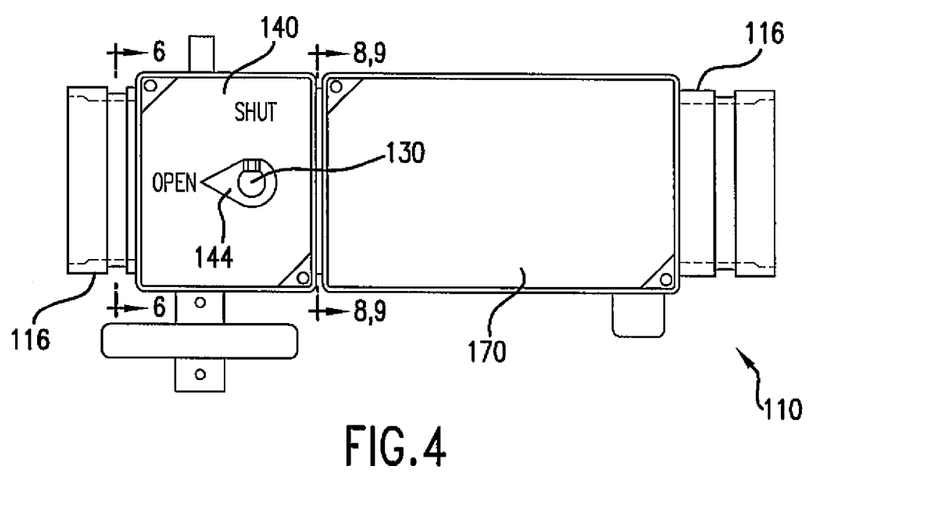
FIG. 4 provides a top view of the flow control assembly as shown in FIG. 3 taken along the site lines 4-4 as shown in in FIG. 2, according to at least one embodiment of the present invention.

FIG. 3 provides a side view of the flow control assembly as shown in FIG. 2, according to various embodiments of the present invention. FIG. 4 provides a top view of the flow control assembly 110 taken along lines 4-4 as shown in FIG. 2. As shown in FIG. 3, the flow control assembly 110 includes a valve housing 116 having an inlet opening 118 and an outlet opening 120. As shown in FIGS. 2 and 3, the inlet opening 118 and the outlet opening 120 are each at least partially defined by a pair of fluid couplings 121. The fluid couplings 121 rigidly connect the flow control assembly 110 to the main feed line 106. As shown in FIG. 3, the fluid couplings 121 may be grooved couplings. In the alternative, the fluid couplings 121 may include flanges or may be threaded. In particular embodiments, the valve housing 116 further includes a drain and test outlet opening 122. The valve housing 116 defines a fluid flow path 124 that extends between the inlet opening 118 and the outlet opening 120 and/or the drain and test outlet opening 122. In particular embodiments, the valve housing 116 at least partially defines a fluid plenum 126. The fluid plenum 126 is in fluid communication with the fluid flow path 124. A flow control valve 128 is disposed within the valve housing 116. The flow control valve 128 is positioned within the fluid flow path 124 generally proximate to the inlet opening 118. In particular embodiments, the flow control valve 128 may be a wafer or a ball type valve.

Figure 5:
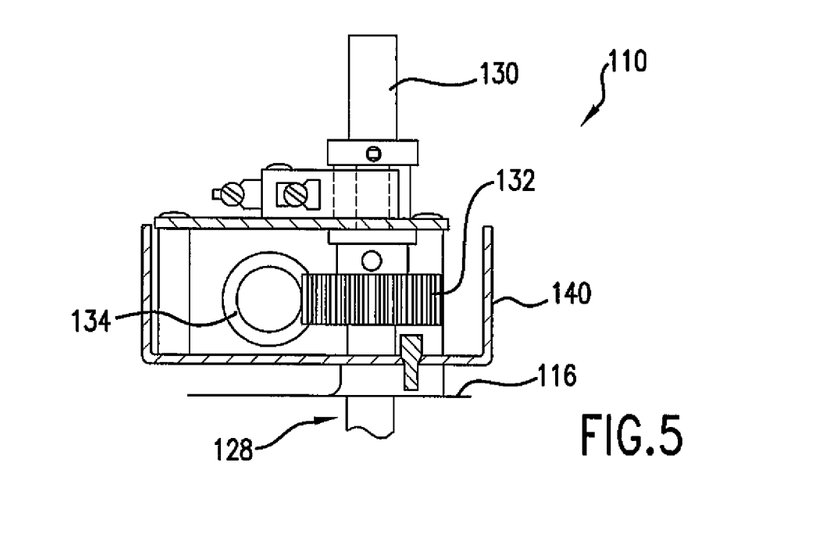
FIG. 5 provides a cross sectional side view of a portion of the flow control assembly taken along lines 5-5 as shown in FIG. 3, according to at least one embodiment of the present invention.
Figure 6:
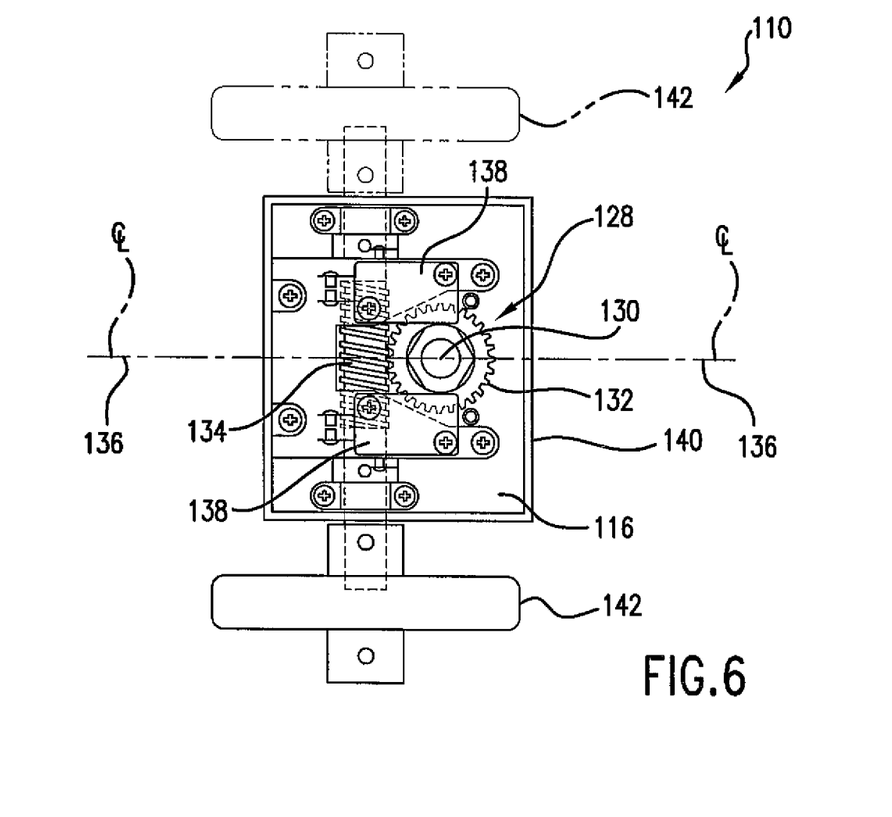
FIG. 6 provides an view inside of a portion of the flow control assembly taken along lines 6-6 as shown in FIG. 4, according to at least one embodiment of the present invention.

FIG. 5 provides a view inside of a portion of the flow control assembly 110 taken along line 5-5 as shown in FIG. 3. FIG. 6 provides a view of a portion of the flow control assembly 110 taken along line 6-6 as shown in FIG. 4. As shown in FIGS. 3, 5 and 6, the flow control valve 128 includes a stem 130. The stem 130 extends through the valve housing 116 and outside of the fluid flow path 124 (FIG. 3). A worm gear system may be used to rotate the flow control valve 110 between an open and shut position. For example, as shown in FIGS. 5 and 6, a worm gear 132 extends circumferentially around the stem 130 outside of the valve housing 116. The worm gear 132 meshes with a worm 134. In particular embodiments, as shown in FIG. 6, the worm 134 extends laterally outwardly with respect to an axial centerline 136 of the valve housing 116.

In particular embodiments, as shown in FIG. 6, the stem 130 may be cam shaped or may be surrounded by a cam. A displacement switch 138 such as a micro switch is engaged with the stem 130. As the stem 130 is rotated, the displacement switch generates a signal to indicate that a change in the rotational position of the stem 130 and thus the position of the flow control valve 128 (FIG. 3) has occurred within the valve housing 116. The signal may be electronically communicated to a monitoring station or to a local alarm. The signal may indicate that the flow control valve 128 (FIG. 3) has been rotated to a shut or partially shut position, possibly indicating intentional tampering with the operation and/or readiness of the flow control assembly 110 (FIG. 3).

As shown in FIGS. 3 and 4, an outer casing 140 may be provided to protect the stem 130, the worm gear 132, the worm 134 and/or the displacement switches 138, as shown in FIGS. 5 and 6. The outer casing 140 may be attached using tamper proof screws or fasteners. The outer casing 140 may prevent accidental damage to and/or intentional tampering with those components.

As shown in FIGS. 3 and 6, a handle 142 may be connected to the flow control valve 128. As shown in FIG. 6, the handle 142 may be connected to the flow control valve 128 at either end of the worm 134 (FIG. 6). The handle 142 may be reversible between either end of the worm 134. In one embodiment, a pair of the handles 142 is attached to both ends of the worm 134. The handle 142 may be turned clockwise and/or counter clockwise so as to rotate the worm 134, thereby rotating the stem 130 and thus the flow control valve 128 incrementally between an open and shut position. As shown in FIG. 4, a valve position indicator 144 may be mechanically attached to the flow control valve 128 via the stem 130 to provide a visual indication of the rotational orientation of the flow control valve 128 within the valve housing 116.

Figure 7:
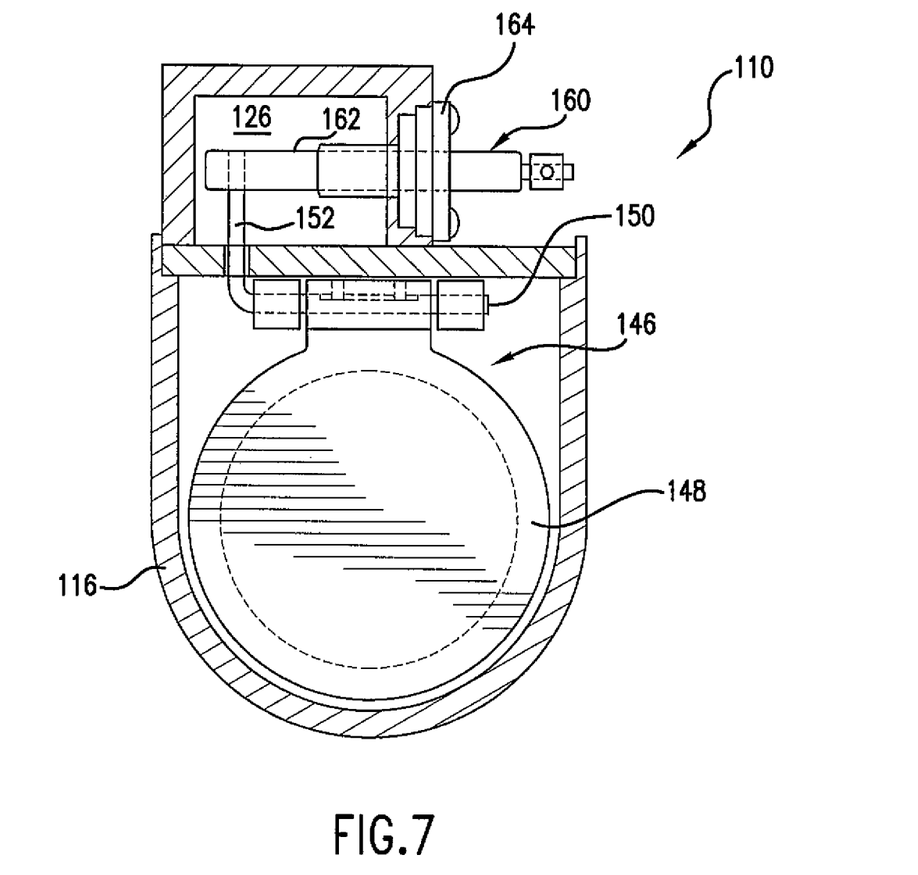
FIG. 7 provides a view looking upstream into a portion of the flow control assembly as seen from site line 7-7 in FIG. 3, according to at least one embodiment of the present invention.

Referring back to FIG. 3, the flow control assembly 110 further includes a swing check valve 146 disposed within the valve housing 116. The swing check valve 146 is positioned within the fluid flow path 124 downstream from the flow control valve 128 and upstream from the outlet opening 120. FIG. 7 provides a view looking upstream into a portion of the flow control valve assembly 110 in the direction of the arrows designated 7-7 in FIG. 3, according to at least one embodiment of the present invention. In one embodiment, as shown in FIGS. 3 and 7, the swing check valve 146 includes a clapper or disk 148 that pivots about a pivot pin 150. An actuator arm 152 extends from and is rigidly attached to the clapper 148 and is rotatable about the pivot pin 150.

As shown in FIG. 3, the clapper 148 rotates about the pivot pin 150 between a fully open position 154, and a closed position 156. A spring (not shown) may provide a sufficient force to the actuator arm 152 and/or to the clapper 148 to close and hold the clapper 148 in the closed position 156 when water 158 (FIG. 2) within the fluid flow path 124 is in a static state. Once the sprinkler head 108 (FIG. 2) opens, the clapper 148 swings into the open position 154. The actuator arm 152 will travel within the fluid plenum 126 as the clapper 148 rotates between the open and closed positions 154, 156.

Figure 8:
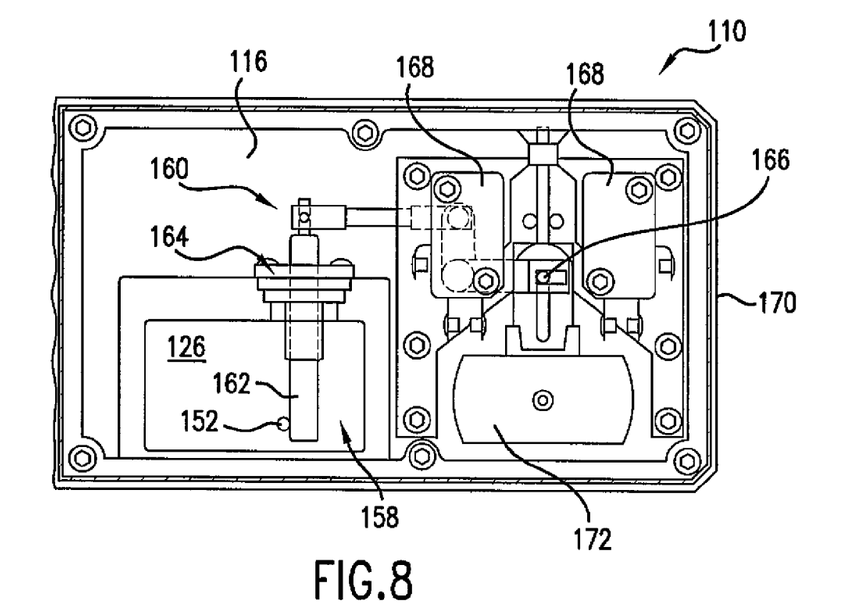
FIG. 8 provides a view of a portion of the flow control assembly taken along lines 8-8 as shown in FIG. 4 including a mechanical linkage, a micro switch and a signal delay device, according to at least one embodiment of the present invention.
Figure 9:
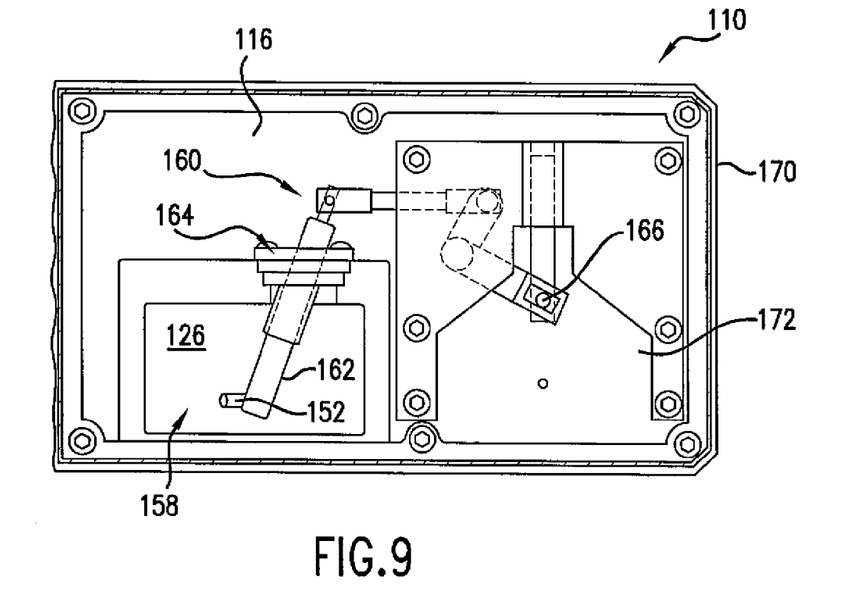
FIG. 9 provides a view of a portion of the flow control assembly taken along lines 9-9 as shown in FIG. 4 including the mechanical linkage and the signal delay device as shown in FIG. 8 with the micro switch removed for clarity, according to at least one embodiment of the present invention.

FIGS. 8 and 9 respectively provide top views of a portion of the flow control assembly 110 including the fluid plenum 126 as taken along lines 8-8 and 9-9 as show in FIG. 4, according to particular embodiments of the present invention. As shown in FIGS. 7, 8 and 9, the flow control assembly 110 also may include a mechanical linkage 160. As shown in FIG. 9 for example, one embodiment of the mechanical linkage 160 desirably includes a plurality of rigid bars that are pivotally connected in series. A first end 162 of the mechanical linkage 160 extends through the valve housing 116 into the fluid plenum 126. The first end 162 may extend through a pivoting seal assembly 164. The pivoting seal assembly 164 seals an opening in the valve housing 116 so as to prevent water 158 from leaking from the fluid plenum 126. The first end 162 of the mechanical linkage 160 is connected to and/or otherwise engaged with the actuator arm 152. As a result, as show in FIG. 9, the first end 162 of the mechanical linkage 160 translates with the actuator arm 152.

In particular embodiments, as shown in FIG. 8 a second end 166 of the mechanical linkage 160 is pivotally connected to an electrical switch 168 such as a micro switch. The flow control assembly 110 may include a plurality of electrical switches. The electrical switch 168 is disposed outside of the fluid flow path 124 (FIG. 3) of the valve housing 116 via one or more bolts, screws or other mechanical fasteners. As shown in FIG. 8, the electrical switch 168 may be connected to the valve housing 116. The electrical switch 168 may be configured to provide an alarm signal to a monitoring station and/or to an alarm system that indicates water flow through the fluid flow path 124.

In one embodiment, as shown in FIGS. 3, 4, 8 and 9, the flow control assembly may further include an outer casing 170 coupled to the valve housing 116. The outer casing 170 may be attached using tamper proof screws or fasteners. The outer casing 170 may prevent accidental damage and/or intentional tampering with the mechanical linkage 160 and/or the electrical switches 168.

As shown in FIGS. 8 and 9, the flow control assembly 110 further includes a signal delay or retard device 172. As schematically shown in FIG. 8 for example, the alarm signal delay device 172 may be electronically connected to the electrical switch 168. A portion of the electrical switch 168 has been removed for clarity in FIG. 9. As shown in FIGS. 8 and 9, the alarm signal delay device 172 may be pivotally connected to the second end 166 of the mechanical linkage 160. The alarm signal delay device 172 delays or prevents transmission of the alarm signal to the monitoring station and/or the alarm system.

FIG. 8 illustrates a possible position of the mechanical linkage 160 when the clapper 148 and thus the actuator arm 152 are in the closed position 156 as shown in FIG. 3, for example such as when the water 158 (FIG. 2) within the fluid flow path 124 (FIG. 3) is in a static state. As shown in FIG. 8, the first end 162 of the mechanical linkage 160 rests against or is otherwise engaged with the actuator arm 152. In this configuration, the electrical switch 168 is open and does not provide an alarm signal.

FIG. 9 illustrates a possible position of the mechanical linkage 160 when the clapper 148 and thus the actuator arm 152 have rotated away from the closed position 156 as shown in FIG. 3, for example such as when the water 158 within the fluid flow path 124 is no longer static and is flowing through the fluid flow path 124. As shown in FIG. 9, the first end 162 translates with the actuator arm 152, thereby causing the second end 166 to translate. As a result, the electrical switch 168 closes or at least partially closes to generate the alarm signal.

The alarm signal delay device 172 may delay transmission and/or prevent transmission of the alarm signal so as to accommodate for inadvertent movement of the clapper 148 of the swing check valve 146 as may result from various flow anomalies within the fire sprinkler system 100 such as water hammer or a fluctuation in fluid pressure within the standpipe and/or the main feed line 106. As a result, the alarm signal delay device 172 may reduce and/or prevent false alarms by delaying transmission of the alarm signal to the monitoring station and/or the alarm system so as to give the clapper 148 sufficient time to return to the closed position 156 during such a non-fire related event.

Referring back to FIG. 3, the valve housing 116 may at least partially define a tap hole 174 disposed downstream from the swing check valve 148 and upstream from the outlet opening 120. In one embodiment, as shown in FIG. 2, the flow control assembly 110 includes a pressure gauge 176 that extends through the tap hole 174 of the valve housing 116 and that is in fluid communication with the fluid flow path 124 (FIG. 3). The pressure gauge 176 (FIG. 2) may provide a visual indication of fluid pressure within the fluid flow path 124. In another embodiment, as shown in FIG. 3, a pressure relief valve 178 may be disposed within the tap hole 174. The pressure relief valve 178 is in fluid communication with the fluid flow path 124. The pressure relief valve 178 may prevent over pressurization of the flow control assembly 110, the sprinkler head 108 and/or the main feed line 106. It should be appreciated that the tap hole 174 may accommodate both the pressure gauge 176 and the relief valve 178 simultaneously.

The flow control assembly 110 as illustrated in FIGS. 2 through 9 and as described herein, provides one or more advantages over conventional fire sprinkler systems. For example, the fire sprinkler system 100 that incorporates the flow control assembly 110 requires relatively little mounting space when compared to the space required to accommodate multiple individual components. In addition, use of the flow control assembly 110 only requires one break in the main feed line 106 verses multiple breaks required by using multiple individual components and by having additional breaks to accommodate the drain/test lines. This significantly reduces the potential for connection leakage and/or failure. As a further advantage, the flow control assembly 110 takes less time to install than the time required to install the various individual components of the conventional fire sprinkler system 10, thus saving installation time and costs. In addition, the flow control assembly 110 may be replaced quickly in case of a damaged or a failed component, thus reducing critical outage time of the fire sprinkler system 100. Another advantage of the flow control assembly 110 over the prior designs is that the single flow control assembly 110 significantly reduces the potential for improper installation as compared to multiple opportunities associated with installing multiple components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A flow control assembly for a fire sprinkler system, comprising:
   a. a valve housing including a single valve body, said valve body defining, an inlet opening an outlet opening and a fluid flow path between said inlet opening and said outlet opening;
   b. a flow control valve disposed within said fluid flow path downstream, of said inlet opening and upstream front said outlet opening, wherein said flow control valve is mounted to said valve body;
   c. a swing check valve disposed within said fluid flow path of said valve body downstream from said flow control valve and upstream from said outlet opening, said swing check valve having a clapper connected to an actuator arm, wherein said clapper swings automatically into an open position in response to a pressure drop downstream from said outlet opening;
   d. an electrical switch mounted to an outside surface of said valve body; and
   e. a mechanical linkage having a first end that extends through a pivoting seal assembly and into said valve body and engages with said actuator arm of said swing check valve and a second end coupled to said electrical switch, wherein said first end translates with said actuator arm and said second end automatically actuates said electrical switch in response to a pressure change between the inlet opening and the outlet opening, wherein said electrical switch provides an alarm signal to indicate water flow through said fluid flow path based on movement of said swing check valve.

2. The flow control assembly as in claim 1, wherein said electrical switch provides an alarm signal to indicate water flow through said fluid flow path based on movement of said swing check valve.

3. The flow control assembly as in claim 2, further comprising an alarm signal delay device electronically connected to said electrical switch, wherein said alarm signal delay device delays or prevents transmission of said alarm signal.

4. The flow control assembly as in claim 1, wherein said valve housing includes a fluid plenum that is in fluid communication with said fluid flow path, said actuator arm extending within said fluid plenum.

5. The flow control assembly as in claim 4, wherein a first end of said mechanical linkage extends through said valve body into said fluid plenum.

6. The flow control assembly as in claim 1, wherein said valve body at least partially defines a test and drain outlet opening disposed downstream from said swing check valve and upstream from said outlet opening.

7. The flow control assembly as in claim 1, further comprising a pressure gage that extends through said valve body to provide a pressure measurement within said fluid flow path.

8. The flow control assembly as in claim 1, further comprising a relief valve that extends through said valve body, wherein said relief valve is in fluid communication with said fluid flow path.

9. The flow control assembly as in claim 1, further comprising a valve position indicator disposed outside of said fluid flow path, wherein said valve position indicator is mechanically linked to said flow control valve.

10. The flow control assembly as in claim 1, wherein the valve housing includes a first side portion and an opposing second side portion, the flow control assembly further comprising a handle mechanically linked to said flow control valve, wherein said flow control handle is reversible between said first and second sides.

11. The flow control assembly as in claim 1, wherein said flow control valve includes a valve stem that extends through said valve body, and said flow control valve includes a displacement switch mechanically coupled to said valve stem.

12. A fire sprinkler supply system, comprising:
 a. a standpipe riser;
 b. a fire sprinkler head disposed downstream from said standpipe riser; and
 c. a flow control assembly that provides for fluid communication between said standpipe riser and said fire sprinkler head, wherein said flow control assembly comprises:
  i. a valve housing comprising a single: valve body, said valve body defining an inlet opening in fluid communication with said standpipe riser and an outlet opening in fluid communication with said fire sprinkler head, wherein said valve body defines a fluid flow path between sai inlet opening and said outlet opening;
  ii. a flow control valve disposed within said fluid flow path of said valve body downstream of said inlet opening and upstream from said outlet opening, wherein said flow control valve is mounted to said valve body;
  iii. a swing check valve disposed within said fluid flow path of said valve body downstream from said flow control valve and upstream from said outlet opening, said swing check valve having a clapper connected to an actuator arm, wherein said clapper swings into an open position in response to a pressure drop downstream from said outlet opening;
  iv. an electrical switch mounted to an outside surface of said valve housing; and
  v. a mechanical linkage having a first end that extends through a pivoting seal assembly and into said valve body and that engages with said actuator arm of said swing check valve, said mechanical linkage having a second end coupled to said electrical switch, wherein said first end of the mechanical linkage translates with said actuator arm and said second end automatically actuates said electrical switch, in response to a pressure change between the inlet opening and the outlet opening, wherein said electrical switch provides an alarm signal to indicate water flow through said fluid flow path based on movement of said swing check valve.

13. The fire sprinkler supply system as in claim 12, wherein said electrical switch provides an alarm signal to indicate water flow through said fluid flow path based on movement of said swing check valve.

14. The fire sprinkler supply system as in claim 13, wherein said flow control assembly further comprises an alarm signal delay device electronically connected to said electrical switch, wherein said alarm signal delay device delays or prevents transmission of said alarm signal.

15. The fire sprinkler supply system as in claim 12, wherein said valve body defines a fluid plenum that is in fluid communication with said fluid flow path, said actuator arm being disposed within said fluid plenum.

16. The fire sprinkler supply system as in claim 15, wherein a portion of said mechanical linkage extends through said valve body into said fluid plenum.

17. The fire sprinkler supply system as in claim 12, further comprising a drain pipe, said valve body including a test and drain outlet opening disposed downstream from said swing check valve and upstream from said outlet opening, wherein said test and drain outlet opening provides for fluid communication between said fluid flow path and said drain pipe.

18. The fire sprinkler supply system as in claim 12, wherein said flow control assembly further comprises a pressure gage that extends through said valve body to provide a pressure measurement within said fluid flow path.

19. The fire sprinkler supply system as in claim 12, wherein said flow control assembly further comprises a relief valve that extends through said valve body, wherein said relief valve is in fluid communication with said fluid flow path.

20. The fire sprinkler supply system as in claim 12, wherein said flow control assembly further comprises a valve position indicator disposed outside of said fluid flow path, wherein said valve position indicator is mechanically linked to said flow control valve.

\* \* \* \* \*